United States Patent [19]

Rallapalli et al.

[11] Patent Number: 4,558,371
[45] Date of Patent: Dec. 10, 1985

[54] METHOD AND DEVICE FOR TWO-DIMENSIONAL FACSIMILE CODING

[75] Inventors: Krishna Rallapalli, San Jose; Shinkyo Kaku, Los Gatos, both of Calif.

[73] Assignee: Advanced Micro Devices, Inc., Sunnyvale, Calif.

[21] Appl. No.: 524,818

[22] Filed: Aug. 19, 1983

[51] Int. Cl.$^4$ .............................................. H04N 1/40
[52] U.S. Cl. .................................................... 358/261
[58] Field of Search ............................... 358/260, 261; 340/347 DD

[56] References Cited

U.S. PATENT DOCUMENTS

| | | | |
|---|---|---|---|
| 3,830,965 | 8/1974 | Beaudette | 358/261 |
| 3,927,251 | 12/1975 | White et al. | 358/261 |
| 3,991,267 | 11/1976 | Beaudette | 358/261 |
| 4,040,093 | 8/1977 | Nakagome et al. | 358/261 |
| 4,048,656 | 9/1977 | Ishii et al. | 358/261 |
| 4,115,815 | 9/1978 | Nakagome et al. | 358/261 |
| 4,117,517 | 9/1978 | Shintani et al. | 358/261 |
| 4,156,880 | 5/1979 | Yamada | 358/261 |
| 4,212,035 | 7/1980 | Nakagome et al. | 358/261 |
| 4,212,036 | 7/1980 | Nakagome et al. | 358/261 |
| 4,245,257 | 1/1981 | Yamazaki et al. | 358/261 |
| 4,258,392 | 3/1981 | Yamazaki et al. | 358/261 |
| 4,486,784 | 12/1984 | Abraham et al. | 358/261 |

Primary Examiner—Edward L. Coles, Sr.
Attorney, Agent, or Firm—Patrick T. King; Gary T. Aka

[57] ABSTRACT

A method and device for two-dimensionally coding digital facsimile signals, especially for the CCITT T.4 recommended standard. A line of digitized picture elements is coded with respect to a reference line of digitized picture elements. The run lengths of color units previous to color change picture elements in the coding and reference lines are accumulated, and the positions of the color change picture elements in the coding line with respect to the positions of the color change picture elements in the reference line are determined by the differences between the accumulated run lengths of the coding and reference line color change picture element and the reference line color change picture elements. The steps are selectively repeated in predetermined sequences responsive to the value of the accumulated run length differences. The present invention also provides for a facsimile device which has control logic for controlling the operations of the device, sequential generators of the accumulated run lengths of each change picture element in the coding line and reference line, logic for determining the differences in the accumulated run lengths of coding and reference line picture elements and an encoder for encoding the difference in accordance with a predetermined code, whereby the control logic responsive to the differences, selectively advances the generators for the accumulated run lengths of the next coding line and reference line change picture elements.

24 Claims, 14 Drawing Figures

ROM 1 TABLE

| INPUT | | | OUTPUT | | | | | | |
|---|---|---|---|---|---|---|---|---|---|
| B0 | B1 | B2 | G1 | G2 | G3 | G4 | G5 | G6 | G7 |
| 0 | 0 | 0 | 1 | 1 | 1 | 1 | 1 | 1 | 1 |
| 1 | 0 | 0 | 0 | 1 | 1 | 1 | 1 | 1 | 1 |
| 0 | 1 | 0 | 0 | 0 | 1 | 1 | 1 | 1 | 1 |
| 1 | 1 | 0 | 0 | 0 | 0 | 1 | 1 | 1 | 1 |
| 0 | 0 | 1 | 0 | 0 | 0 | 0 | 1 | 1 | 1 |
| 1 | 0 | 1 | 0 | 0 | 0 | 0 | 0 | 1 | 1 |
| 0 | 1 | 1 | 0 | 0 | 0 | 0 | 0 | 0 | 1 |
| 1 | 1 | 1 | 0 | 0 | 0 | 0 | 0 | 0 | 0 |

FIG. 7.

ROM 2 TABLE

| INPUT | | | | | | | | OUTPUT | | | |
|---|---|---|---|---|---|---|---|---|---|---|---|
| A0 | A1 | A2 | A3 | A4 | A5 | A6 | A7 | O0 | O1 | O2 | O3 |
| 0 | 0 | 0 | 0 | 0 | 0 | 0 | 0 | 0 | 0 | 0 | 1 |
| 1 | 1 | 1 | 1 | 1 | 1 | 1 | 1 | 0 | 0 | 0 | 0 |
| 0 | 1 | 1 | 1 | 1 | 1 | 1 | 1 | 1 | 0 | 0 | 0 |
| 0 | 0 | 1 | 1 | 1 | 1 | 1 | 1 | 0 | 1 | 0 | 0 |
| 0 | 0 | 0 | 1 | 1 | 1 | 1 | 1 | 1 | 1 | 0 | 0 |
| 0 | 0 | 0 | 0 | 1 | 1 | 1 | 1 | 0 | 0 | 1 | 0 |
| 0 | 0 | 0 | 0 | 0 | 1 | 1 | 1 | 1 | 0 | 1 | 0 |
| 0 | 0 | 0 | 0 | 0 | 0 | 1 | 1 | 0 | 1 | 1 | 0 |
| 0 | 0 | 0 | 0 | 0 | 0 | 0 | 1 | 1 | 1 | 1 | 0 |

METHOD AND DEVICE FOR TWO-DIMENSIONAL FACSIMILE CODING

FIELD OF THE INVENTION

This invention relates to facsimile systems and, more particularly to a method and device for two-dimensionally coding digital facsimile signals.

BACKGROUND OF THE INVENTION

Facsimile systems are used for the electrical transmission of documents over long distances. The image of a document is broken up into a series of electrical signals which are transmitted to and received at a distant location. The signals are processed to reform the image of the original document.

Typically, the original document is scanned line by line. Each scan line covers a strip of the document and is a series of digital signals, each signal representing the state of a particular area on the strip. Typically, a "0" signal means that the corresponding area is "white" or unmarked. A "1" signal means that the area is marked, or "black," with part of a character or letter on the document, for example. Each scan line then has a sequence of "1"s and "0"s indicative of the image information on the strip.

Heretofore, this information was transmitted in this form, with each binary digital signal corresponding to a particular area on the document. More recently, efforts have been made to compress the amount of information sent to save transmission times and lower costs. One approach has been to code the digital information on each scan line. This technique is based upon the correlation of information in the horizontal direction, i.e., in the direction along the scan line. Each scan line consists of an alternating sequence of black and white color units, each color unit being, in turn, a sequence of binary digital signals all representing the same color. Each color unit is either all "1"s or all "0"s. For a discussion in greater detail of one-dimensional facsimile coding, also called run length coding, see the patent application, U.S. Ser. No. 524,817, entitled A Facsimile Device for Run Length Coding, filed of even date, by the applicants.

Another technique used in coding facsimile information is two-dimensional coding, in which the correlation of information in the vertical direction is used. Generally speaking, information of a reference line, which has already been processed, is used to code the information on a subsequent scan line, called the coding line. In two-dimensional coding, the run length coding discussed above is also used when the correlation of information in the vertical direction is not very high.

Both one-dimensional and two-dimensional coding techniques have been standardized. See, for example, "International Digital Facsimile Coding Standards," by Roy Hunter and A. Harry Robinson, *Proceedings of the IEEE*, Volume 68, number 7, July 1980, pages 854–867. As explained in that paper, two-dimensional coding uses "color change picture elements" which are the picture elements in each scan line, whose color is different from the color of the preceding picture element. In terms of color units, the change picture element is the first picture element of each color unit in a scan line. In two-dimensional coding the change picture elements in the coding line are coded with respect to the change picture elements in the reference line.

The present invention performs two-dimensional facsimile coding generally based upon the international standards above. However, by a novel method of performing the two-dimensional coding and a device to perform the coding, the present invention offers many advantages over the prior art. The exemplary invention offers a large improvement in speed over the prior art. This invention also permits the realization of the coding device in an integrated circuit using present day VLSI (very large scale integration) technology. The requirements in the prior art made such VLSI implementation unfeasible.

SUMMARY OF THE INVENTION

The present invention achieves all of these advantages by providing in a facsimile system for digitized picture elements of units of alternating color, a method of coding a line of the digitized picture elements with respect to a reference line of digitized picture elements comprising (a) accumulating the run lengths of color units previous to a color change picture element in the coding line, (b) accumulating the run length of a color change picture element in the reference line from the run lengths of color units previous to the color change picture element, (c) determining the position of the color change picture element in the coding line with respect to the position of the color change picture element in the reference line by the difference between the accumulated run lengths of the coding line color change picture element and the reference line color change picture element, and (d) generating a coding signal indicative of the difference, wherein the steps (a), (b), (c) and (d) are selectively repeated in predetermined sequences responsive to a prior determination of the accumulated run length differences, each repetition of steps applying to successive color change picture elements in the coding and reference lines.

The method further comprises (e) holding the run length of a color unit immediately previous to a coding line color change picture element having its run length accumulated, and (f) generating a coding signal indicative of the run length responsive to a determination of the accumulated run length differences, whereby the coding line is run length coded.

To facilitate the carrying out of this novel method of two-dimensional facsimile coding, the present invention also provides for a facsimile device for coding the positions of the color change picture elements in a coding line of digitized picture data with respect to the position of change picture elements in a reference line of digitized picture data, comprising control logic for controlling the operations of the device, means coupled to the control logic and responsive to consecutive blocks of the coding line and reference line picture data for sequentially generating the accumulated run lengths of each change picture element in the coding line and reference line, the accumulated run lengths being generated in parallel; means responsive to the sequential generating means for determining the difference in accumulated run lengths of a coding line change picture element and a reference line change picture element; means coupled to the control logic and responsive to the determining means for coding the difference in accordance with a predetermined code; whereby the control logic, responsive to the difference, selectively advances the generating means for the accumulated run length of the next coding line change picture element and the next reference line change picture element and enables the coding means in accordance with predetermined conditions upon the difference.

This facsimile device operates in a fashion such that the generating means generates in a single clock cycle the accumulated run length of a change picture element in a picture data block provided the previous change picture element is also in the picture data block. The generating means in this facsimile device comprises a first generator for sequentially generating the accumulated run lengths of change picture elements in the encoding line and a second generator for sequentially generating the accumulated run lengths of change picture elements in the reference line, each generator comprising means responsive to the generating means for combining the run length of a color unit with the run lengths of previous color units so that the accumulated run length of the change picture element beginning the next color unit is generated.

BRIEF DESCRIPTION OF THE DRAWINGS

An understanding of the present invention will be facilitated by a perusal of the following detailed description with reference to the following drawings:

FIG. 2 is a unitary drawing formed by joining FIG. 2B.

DETAILED DESCRIPTION OF EMBODIMENTS OF THE INVENTION

An understanding of the coding procedure defined by the CCITT T.4 standards in the above IEEE paper is useful in understanding the present invention.

The standard identifies five change picture elements, which are elements whose "color" differs from the previous color element on the same scan line. The first change picture element is the $a_0$ change picture element on the coding line. This element is a reference point for the other following defined change picture elements. The $a_1$ change picture element is the first change picture element in the scanning direction whose color is opposite to that of the reference element. The $a_2$ change picture element is the first change picture element in the scanning direction having its color opposite from the $a_1$ change picture element and the same as the $a_0$ change picture element.

In the reference line the $b_1$ change picture element is the first such element following the reference $a_0$ element in the scanning direction having a color opposite from the $a_0$ element and the same as the $a_1$ element. The final element is the $b_2$ element, which is the first change picture element following the $b_1$ element in the scanning direction and having a color opposite to that of the $b_1$ element and the same as the $a_2$ element. In the explanation that follows the scanning direction is always shown as proceeding from left to right, though there is no technical reason why the opposite direction may not be chosen.

The coding procedure is to generally find a spatial correlation between the $a_1$ and $b_1$ change picture elements. If such is not the case, then run length coding, i.e., one-dimensional coding, is used. In this way information about the coding line can be sent with respect to a known reference line. After $a_1$ has been coded, then starting or reference element $a_0$ is redefined and the procedure starts over again until the coding line is completely codes.

Thus the CCITT T.4 standard has three coding modes. The first coding mode is the pass mode. This occurs when the position of the $b_2$ element lies to the left of the $a_1$ element. What occurs here is that the reference line has more change picture elements from which to code the $a_1$ element in the coding line than is needed. In such a case, the coding procedure is to issue a special coding word indicating "pass" and resets the reference element $a_0$ under the $b_2$ element to start the coding procedure again. The $a_1$, $a_2$, $b_1$, $b_2$ are redefined accordingly.

If the pass mode is not detected, then the distance in the horizontal direction between $a_1$ and $b_1$ is determined. If the horizontal distance is equal to or less than 3 picture elements, then this distance, the relative position of $a_1$ with respect to $b_1$, is coded. The next coding begins with former $a_1$ being defined as the $a_0$ reference element. The new $a_1$, $a_2$, $b_1$, $b_2$, elements correspondingly determined and the coding cycle is iterated.

On the other hand, if the horizontal distance between $a_1$ and $b_1$ are greater than 3 picture elements, the positions $a_1$ and $a_2$ are coded by the one-dimensional coding method. A code word indicating that this horizontal mode has been entered and code words indicating the distance between the $a_0$ and $a_1$ elements and the distance between the $a_1$ and $a_2$ elements is generated. After this coding the reference element $a_0$ is redefined and reset in the original $a_2$ position and new $a_1$, $a_2$, $b_1$, $b_2$, are determined for the next coding.

Figure 1A:
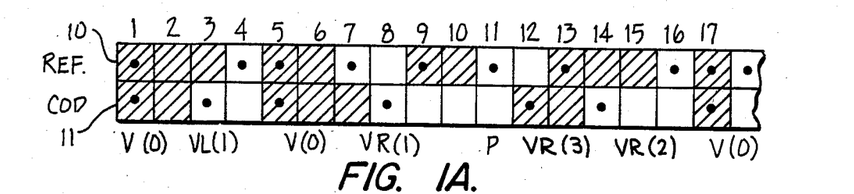
FIGS. 1A, 1B and 1C are examples of reference lines and coding lines illustrative of the two-dimensional coding method used in the present invention.
Figure 1B:
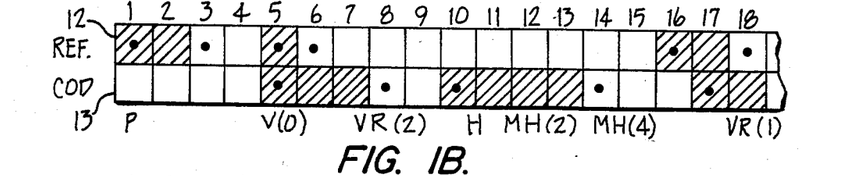

FIGS. 1A and 1B present illustrative examples of this two-dimensional coding procedure. In FIG. 1A a coding line 11 is coded with respect to a reference line 10. The picture element positions of each line are numbered from 1 to 17, though, as indicated in the drawing, the lines and the picture elements continue. Each change picture element is indicated with a dot in the center of its area.

Under the coding procedure above, at the start of a coding line the $a_0$ element is set on an imaginary white color change element situated just before the first actual element on the coding line. In FIG. 1A the first $a_0$ element is an imaginary element immediately to the left of the number 1 picture element. The first color change elements in the reference and coding lines are both black; thus they become the $b_1$ and $a_1$ elements respectively. The fourth picture element in the reference line is $b_2$ while the third picture element in the coding line is $a_2$. Since $a_1$ is located immediately below $b_1$, a vertical mode code "V(0)" is appropriate. Next, the first picture element in the coding line becomes the position of the new $a_0$ change picture element. The third picture element becomes $a_1$ and the fifth becomes $a_2$ in the coding line. In the reference line the fourth picture element is $b_1$ and the fifth $b_2$. Since $a_1$ in this case is one picture element to the left of the new $b_1$, the second color change element in the coding is appropriately coded "VL(1)", indicating that $a_1$ is located one picture element to the left of $b_1$.

The iterative procedure continues with $a_0$ being defined as the third picture element in the coding line. The fifth and eighth picture elements become $a_1$ and $a_2$ respectively. In the reference line above, the fifth and seventh picture elements become $b_1$ and $b_2$ respectively. The fourth picture element in the coding line cannot be $b_1$ since it is the same color as $a_0$. Since $b_1$ is immediately above $a_1$, $a_1$ in this case is appropriately coded "V(0)."

The reference element $a_0$ then moves to the fifth picture element in the coding line with the eighth picture element being $a_1$ and the twelfth $a_2$. The seventh and ninth picture elements in the reference line are $b_1$ and $b_2$ respectively. This yields a coding of "VR(1)". The $a_1$ element is located to the right of $b_1$ by one picture element.

With the eighth color picture element in the coding line becoming $a_0$ the twelfth is $a_1$ and the fourteenth $a_2$. The ninth and eleventh picture elements in the reference line are $b_1$ and $b_2$ respectively. Coding for the twelfth picture element in the coding line is "VR(3)", indicating that $a_1$ is three picture elements to the right of $b_1$.

In a similar fashion the next two color change elements in the coding line are vertically coded "VR(2)" and "V(0)".

For the purposes of this disclosure, symbols which are easily understood are used. "V(0)," "VR(X)" and "VL(x)" X from 1 to 3, represent the vertical mode code words up represents the pass mode. "H" and "MH(Y)" represent horizontal mode code words. Of course, each of these representations correspond to digital signals. Code words which are defined by international standards. See the IEEE paper by Hunter and Robinson referred to above.

In FIG. 1B in which a coding line 13 is coded with respect to a reference line 12, the pass mode and horizontal mode of the two-dimensional coding procedure is demonstrated.

Since the coding line 13 is at its beginning, $a_0$ is presumed to exist immediately to the left of the first picture element in the coding line 13. The first appearing color change element opposite in color to $a_0$, which is presumed to be white, is located at the fifth picture element of the coding line 13. This is $a_1$. The eighth picture element is $a_2$. In the reference line 12 the first color change element of opposite color to $a_0$ is in the first position. It is $b_1$. The $b_2$ is located at the third picture element in the reference line 12. Since $b_2$ appears before $a_1$ the "P" code, indicating the pass mode, is appropriate.

Next, the reference $a_0$ is then moved to the picture element immediately below the original $b_2$ which, in this case, is the third picture element. The change picture elements $a_1$, $a_2$, $b_1$ and $b_2$ are also redefined. The redefined $a_1$ element is now located in the fifth position and the redefined $a_2$ element located in the eighth position in the coding line 13; in the reference line 12 redefined $b_1$ and $b_2$ are in the fifth and sixth positions respectively. Thus redefined $a_1$ is coded "V(0)." For the coding cycle, $a_0$ is defined at the fifth position on the coding line 13. The $a_1$ is now located in the eighth position and $b_1$ in the sixth position in the coding line 12. This leads to a coding of "VR(2)", since $a_1$ is two picture elements to the right of $b_1$.

The reference element $a_0$ is then relocated in the eighth position in the coding line 13 making the tenth and fourteenth positions $a_1$ and $a_2$ respectively. However, $b_1$ does not occur until the sixteenth position in the reference line 12. The horizontal distance between $a_1$ and $b_1$ is greater than 3 picture elements so that the horizontal mode is entered. A special "H" signal is generated indicating horizontal mode signals and the "MH(2)" and "MH(4)" signals follow. These two signals respectively indicate the horizontal distance between $a_0$–$a_1$ and $a_1$–$a_2$. It should be noted that these distances are also the run lengths of color units immediately proceeding the $a_1$, and $a_2$ change picture elements.

The reference change picture element $a_0$ moves to the fourteenth position, the former $a_2$ element. The $a_1$ element is at the seventeenth position of the coding line 13 and $b_1$ the sixteenth position of the reference line 12. This yields a vertical coding of "VR(1)."

Based upon this coding procedure the prior art has yielded extremely complicated logic design. For example, in U.S. Pat. No. 4,245,257, issued Jan. 13, 1981 to Y. Yamazaki et al., the calculation of the distances $a_0$–$a_1$, $a_1$–$b_1$, $b_2$–$a_2$ and the detection of $a_1$, $a_2$, $b_1$, and $a_2$ is necessary. The control of the load address of the line memory, which holds the digitized picture information scanned from the original document, is necessary. Furthermore, additional manipulation of signals occurs when a new starting point picture element $a_0$ the address control is very complicated. All these requirements impede the implementation of high speed operation in the coding of the document.

The method of the present invention does not adopt the prior method of detecting $a_1$, $a_2$, $b_1$ and $b_2$ and calculating the distances $a_0$–$a_1$, $a_1$–$a_2$ and so forth for each coding. The problem of the access addressing the line memory being reset back never occurs. In this invention the access address is continually advanced. The problem of accessing the same address twice does not appear.

THE CODING METHOD OF THE PRESENT INVENTION

Figures 2, 2A:
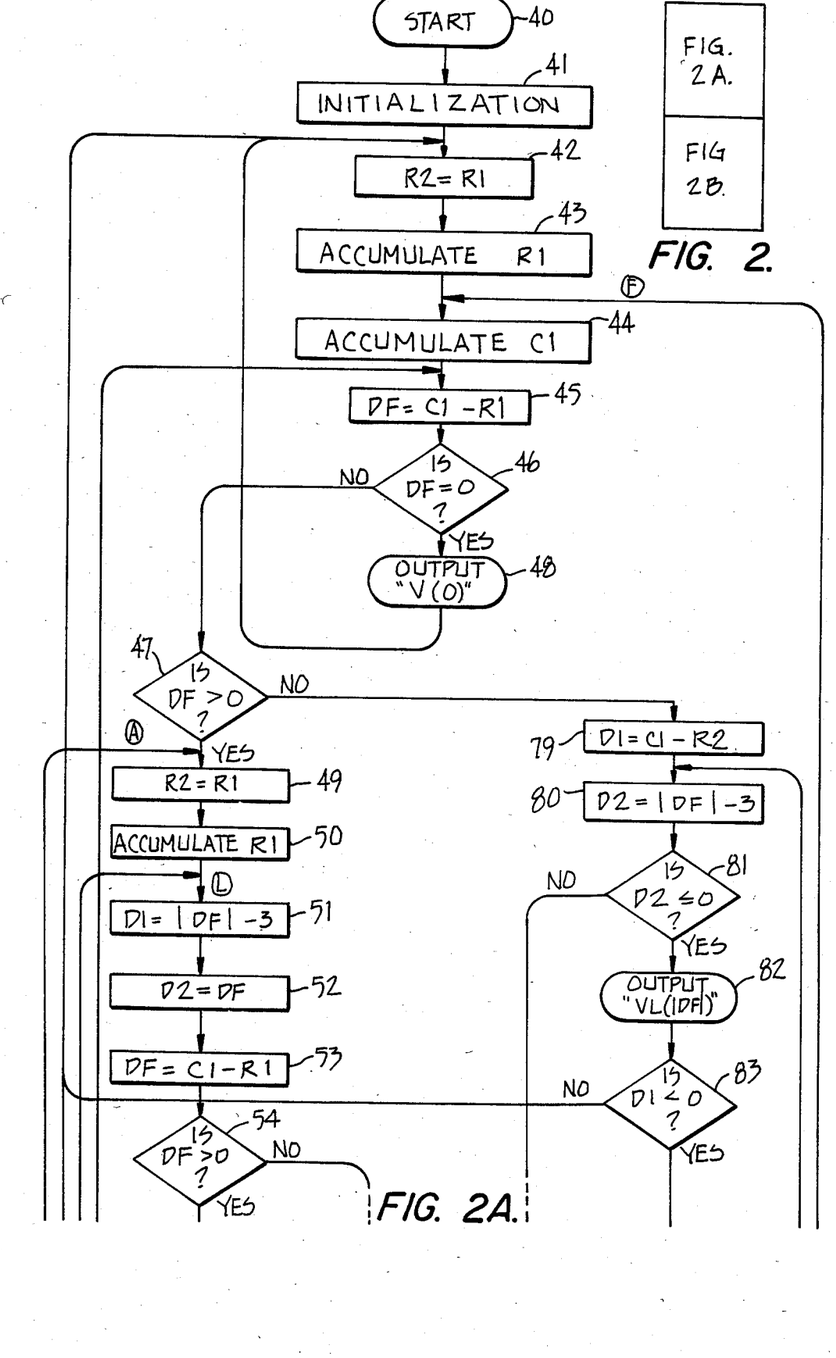
FIGS. 2A–B are flow charts of steps used in the method.
Figure 2B:
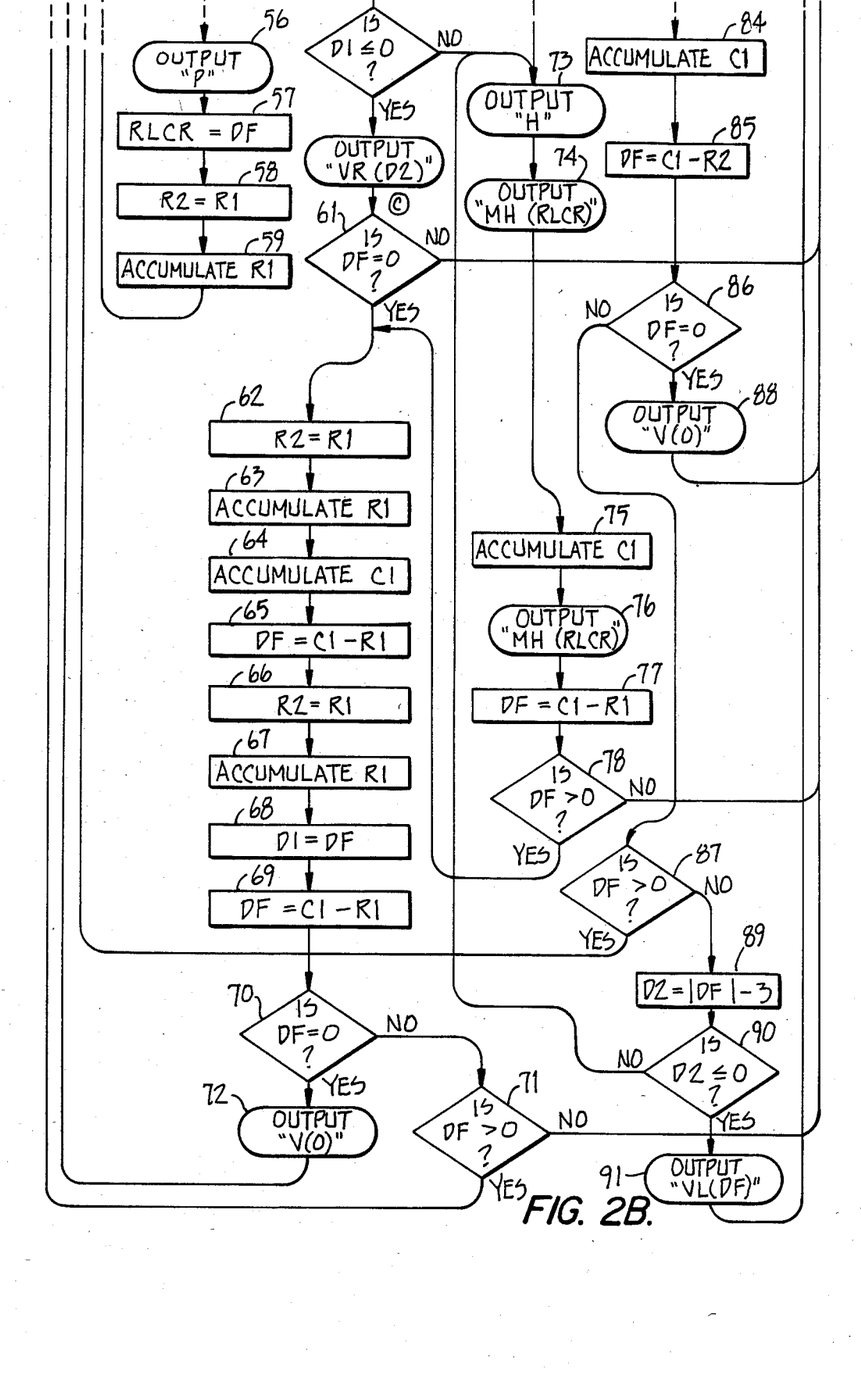

FIG. 2 is a flow chart of the steps used by the present invention to code a coding line with respect to a reference line. References are made to different registers which are used in the coding process. An explanation of their operation and location within the circuitry of the present invention is made later. These registers function in the coding method as follows:

R1 and R2 hold values of the accumulated run lengths of change picture elements in the reference line.

C1 holds accumulated run lengths of change picture elements in the coding line.

DF which holds values of the difference in run lengths for change picture elements in the coding and reference lines.

RLCR holds the run length of the color unit immediately prior to the change picture element which has its accumulated run length in the C1 register.

D1 and D2 are registers which hold values calculated derived from the values held in the C1, R1 and R2 registers.

The accumulated run length of a change picture element is the sum or accumulation of run lengths of color units previous to the color change picture element. The horizontal position of any color change picture element along a line is determined by its accumulated run length. This run length accumulation is performed on the reference line and coding line. To determine the position of a change picture element in the coding line with respect to a change picture element in the reference line, the difference in accumulated run lengths for the two change picture elements is performed. The accumulation of run lengths for the coding line and the reference line are not necessarily performed alternately, since the CCITT standard is dependent upon the exact information on the respective coding and reference lines.

The start steps 40 and the initialization step 41 in FIG. 2 begin the coding process for a line of picture data. In step 42 the accumulated run length value in the register R1 is stored in R2. At the beginning, of course, both R1 and R2 registers are zero. In step 43 the first run length value in the reference line is accumulated and placed in register R1. In step 44 the same occurs for the coding line. As in the CCITT standard, it is assumed that each coding and reference line begins with an imaginary $a_0$ element, assumed to be white, which is located immediately before the very first picture element of each line.

In step 45 the difference between these first accumulated run lengths is calculated and stored in the DF register. In the language of the CCITT standard, the position of the first $a_1$ is determined with respect to the first $b_1$. The decision steps 46 and 47 determine which branch the coding process will enter depending upon the value of the difference in the register DF. If the accumulated run lengths are equal, then an output signal "V(0)" is generated by the step 48 and the process returns to step 42. On the other hand, if the accumulated run length for the reference line is greater than for the coding line i.e., the reference line is ahead of the coding line, then the branch beginning with the step 79 is entered. If the coding line is ahead of the reference line then the branch beginning with step 49 is entered.

The steps 49 to 53 are performed to determine if the next color change element in the reference line is ahead of the present color change element in the coding line or "Is $b_2$ ahead of $a_1$?" The accumulated run length in register R1 is stored in R2 and the register R1 is loaded with the accumulated run length of the next color unit in the reference line by step 50. In the step 51 the register D1 is loaded with a value based upon a difference in the previous change picture element in the reference line and the current change picture element in the coding line. This difference is stored in the register D2 in step 52 and a new difference is calculated between the current reference line change picture element and the current accumulated run length for the reference line ("$a_1-b_2$" in the language of the standard).

The decision step 54 forms a branching point dependent upon the value in the register DF. If DF is greater than 0, i.e., $b_2$ is ahead of $a_1$, then an output signal "P" is generated by the step 56. The difference in the register DF is stored in the run length count register (RLCR) by the step 57 and the current accumulated run length is stored in the register R2 by the step 58. The reference line is accumulated once more and stored in register R1 by the step 59 and the process returns to the step 45.

Returning to the decision step 54, if the value in the DF register is not greater than 0, then a determination by the step 55 is made whether the difference between the current accumulated run length in the coding line and the former accumulated run length in the reference line, now stored in register D2, is less than or equal to 3.

Refer back to step 51. If the determination is positive then the vertical mode coding signal "VR(D2)" is generated. The step 55 then forms a branching point in the coding process dependent upon the current value of the difference.

If DF is, in fact, 0, i.e., $b_2$ is directly above $a_1$, then the steps 62–69, which accumulate the coding line once (step 64) and accumulate the reference line twice (step 63 and step 67) are performed. The two decision steps 70, 71 form a triple branching function dependent upon whether the newly calculated difference in the register DF is equal to, less than or greater than 0.

Returning to the step 55, if value in the D1 register is greater than 0, or alternatively the DF register value in the step 51 is greater than 3, then the horizontal mode is entered. The steps 73–76 perform the function of sending a horizontal mode signal "H" and the coded run length values of the color units. The steps 77 and 78 calculate the new difference and form a decision point for returning the coding process after the horizontal mode.

Finally, returning to the decision step 47, if the original DF value is not greater than 0, i.e., the reference line is ahead of the coding line, the sequence of steps beginning with the step 79 is entered. Step 79 is a calculation of the current position of the change picture element in the coding line with respect to the change picture element previous to the current one in the reference line. This calculation is stored in the register D1. The step 80 is a calculation to determine the value of the current difference in the register DF. The result is stored in the register D2. If the DF value is greater than 3, then by the decision step 81, the horizontal mode is entered. If, in fact the DF register contains a value less than 3, then the step 82 generates the output "VL(DF)".

The decision step 83 refers back to the step 79 to perform a "relation back" check. If the D1 register value is not less than 0, then the current change picture element in the coding line is at least equal or ahead of the previous color change picture element in the reference line. If such is the case, the coding procedure returns to step 42. However, if such is not the case, then the arrangement of the color change elements in the reference line and coding line are such that the previous color change picture element in the coding line will play a part in the coding of the coding line. The coding line is accumulated by the step 84 and a difference is calculated between this next color change picture element in the coding line and the former color change picture element in the reference line by the step 85. The decision steps 86 and 87 form branching points dependent upon this difference. If the difference is 0 then the output signal "V(0)" is generated by the step 85. The newly accumulated color change picture element and the coding line is directly below the former color change picture element in the reference line.

If the difference is greater than 0, the coding line change picture element is ahead of the previous change picture element in the reference line, then the coding process returns to the step 51. On the other hand, if the coding line change picture element is behind the previous reference line change picture element, then the step 89 quantifies the difference in positions between the two picture elements. If the difference is greater than 3 picture elements, then the decision step 90 transfers the process to the step 73 and the horizontal mode. If the difference is less than or equal to 3, then the vertical mode is coded and the step 91 generates the signal "VL(DF)". The coding process then returns back to the step 44.

For coding at the end of coding lines, an assumption is made that after the last picture element in the line there is a final color change picture element having, naturally, a color different from that of the last picture element. In this way the coding process explained above proceeds.

ILLUSTRATIONS OF THE PRESENT CODING METHOD

Figure 1C:
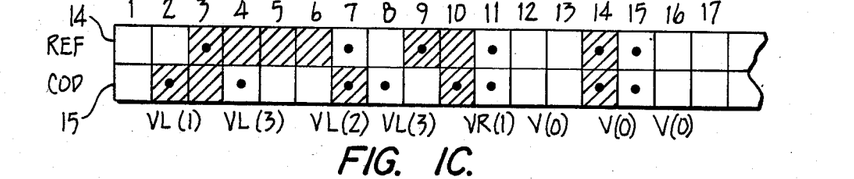

This coding process of the present invention is illustrated by the examples in FIG. 1.

For the coding of the line 11 with respect to the line 10, the run lengths of the first color change elements in the coding line 11 and reference line 10 are accumulated, steps 43 and 44. Since each line is assumed to begin with a white picture element immediately to the left of the first picture element 1 of each line, the R1 and C1 registers are both 0, indicating that the first change picture elements are black and located in the position of the first picture element. Step 45 performs the subtraction and DF is 0 yielding an output signal "V(0)." The coding process then returns to the step 42.

Next the register R2 is loaded with the value 0 from the register R1. R1 is accumulated and a value of 3 is stored in R1. The coding line 11 is accumulated by step 44 for a value 2 in the C1 register. The step 45 performs the subtraction and the two decision steps 46 and 47 direct that the process proceed to step 79. D1 register is loaded with the value 2, (2 minus 0) and the D2 register by the step 80 is loaded with the value $-2$, 3 subtracted from the absolute value of minus 1. Since the D2 register is less than 0, the decision step 81 leads to step 82, which generates an output of "VL(1)", the change picture element in the coding line 11 at position 3 is to the left of the change picture element in the reference line in the reference line 10.

The D1 register value is equal to 3. Thus the decision step 83 puts the coding process back to the step 42. The register R2 is loaded with the value of 3, the accumulated run length of the change picture element in the reference line 10 and the current accumulated run length of 4 is loading to the register R1 by the step 43. The step 44 accumulates the coding line 11 which present change picture element at positions has an accumulated run length of 4. The difference is calculated by the step 45 and the decision step 46 leads to an output signal "V(0)."

Returning again to the step 42, the R2 register is loaded with the value of 4, the previous accumulated run length, and the reference line 10 is accumulated to determine the position of the next change picture element in the reference line 10. This element is in the seventh picture element position and therefore an accumulated run length of 6 is stored in the R1 register. Similarly this step 44 leads to the storing of a value of 7 in the C1 register. The difference performed by the step 45 leads to a value of $+1$ for the DF register and the coding process enters the branch beginning with the step 49.

The R2 register is loaded with the value of 6 and the reference line is accumulated once more for the R1 register. This register has a value of 8 for the next color change element located in the ninth position. The step 51 performs a calculation for the register DF which, at this point, is still loaded with the difference between the current accumulated run length for the coding line 11 and the accumulated run length for the previous color change element in the reference line 10 by the step 52. A value of $+1$ stored in the register D2 is moved into the DF register. The step 53 performs a difference calculation for the current change picture elements IN the coding and reference lines. The DF register is loaded with the value $-1$. Since the DF value is not greater than 0, the decision step 54 leads to the decision step 55, which asks whether the old value of DF was less than or equal to 3. Since D1 is $-2$, the answer is affirmative and the step 60 generates an output signal of "VR(1)".

The step 61 returns to the current value of DF to determine whether the value therein is equal to 0 or not. Since the current value of DF is $-1$, the decision step 61 leads to the step 44.

The coding line 11 is accumulated once again and the C1 register now contains the value of 11. The next change picture element in the coding line 11 is located in the twelfth picture element position. The step 45 performs the difference operation again yielding a difference of $+3$. Since the DF value is not equal to 0 and it is greater than 0, the steps 46 and 47 point to the branch beginning with the step 49.

The register R2 is loaded with the value of 8 and the reference line 10 is accumulated once more. The register R1 is loaded with the value of 10 for the change picture element in the eleventh picture element position. The step 51 yields a value of 0 for the D1 register. The D2 register is loaded with the value of 3 and a recalculation of the difference between the current change picture elements in the coding and reference lines lead to a value of $+1$ by the step 53. Since this value is greater than 0, the decision step 54 indicates the generation of the pass output signal "P" by the step 56. The register RLCR is loaded with a value of 1 by the step 57. The register R2 is updated to contain the value of 10 and the reference line is accumulated once again. R1 by step 59 now contains a value of 12.

The process returns to the step 45. Since the register DF contains the value of $-1$, the coding process jumps to the step 79. In this manner the codes of "VL(1)," "VL(2)," and "VL(0)," are generated as shown in FIG. 1A.

The present coding methods will also generate the same signals as discussed previously for FIG. 1B. After the starting initialization steps the R1 register for the reference line 12 is loaded with the value of 0 since the first change element is in the first picture element position. On the other hand, the step 44 leads to a value of 4 since the first color picture element in the coding line 13 is in the fifth picture position. The difference of $+4$ is stored in the DF register. Since DF is greater than 0, the decision steps 46 and 47 point to the step 49. The register R2 is loaded with the value of 0 and the next change picture element in the third picture element position is accumulated. The register R1 is loaded with the value of 2 for the change picture element in the third picture element position in the reference line 12. Since DF is equal to 4 the step 51 yields a value of $+1$ for the D1 register. Similarly the D2 register is loaded with the value of 4. The step 53 performs the difference operation for the current values in the C1 and R1 registers which leads to a value of 2 for the DF register. In the CCITT coding standard language that $b_2$ is ahead or to the left of $a_1$. Therefore the decision step 54 leads to the generation of a pass output signal "P" by the step 56.

The value of 2 in the DF register is loaded into the RLCR register by the step 57 and the R2 register is updated to the value of 2. The reference line 12 is accumulated once more so that the R1 register contains the value of 4. Returning to the step 45, the difference operation between the current accumulated run lengths in the C1 and R1 registers lead to 0. Therefore an output signal of "V(0)" is generated and the coding process returns to step 42.

The R2 register is loaded with the value of 5 and the reference line 12 is accumulated once more. The R1 register contains a value of 5 for the new change picture element in the sixth picture element position. On the other hand, the coding line 13 has also been accumulated by the step 44 so that C1 now contains the value of 7 reflecting the position of the next change picture element in the coding line 13. The difference operation, the step 45, is performed and a value of 2 is loaded into the DF register. Since DF is greater than 0, the decision steps 46 and 47 lead to the steps 49-53, which check whether the next color change element in the coding line occurs previous to the current color change element in the coding line 13. This determines whether pass mode coding is appropriate. A value of 5 is loaded into the R2 register by step 49. The R1 register is loaded with the value of 15 since the next change picture element in the reference line 12 is located at the sixteenth position in the reference line 12. By the step 51 the D1 register is equal to $-1$, while the D2 register is loaded with the value 2. The step 53 calculates the updated difference and the value of $-8$ is loaded into the register DF.

Thus, the decision step 54 leads to the decision step 55. Since the D1 value is less than 0, the output signal "VR(2)" is generated by the step 60. Since DF is not equal to 0, the decision step leads the coding process to the step 44, which has the coding line 13 accumulated again. The C1 register is updated to the value of 9 and a recalculation of the difference between the current accumulated run lengths of the change picture elements in the reference line 12 and the coding line 13 is performed. The DF register is loaded with the value of $-6$.

Thus the decision steps 46, 47 lead to the step 79. The D1 register is loaded with the value of $(9-5=)4$. The D2 register is $(6-3=)3$ and therefore the branch by the step 81 leads to the horizontal mode. An output signal of "H" is generated by the step 73. The step 74 generates the output signal of the run length of the color unit immediately previous to the current color change element in the coding line 13. The step 74 accumulates the coding line 13 and the C1 register is loaded with the value of 13. The step 76 sends the output signals of "MH(4)" as output signals. The register RLCR the run length code register, is a register which contains the run length of each color unit immediately previous to a change picture element in the coding line. In the language of the CCITT standard the steps 74 to 76 send the horizontal run length codes of the distances $a_0-a_1$ and $a_1-a_2$.

The step 77 recalculates the difference for the current change picture elements in the coding and reference lines. DF is loaded with the value of $(13-15=)-2$. Thus the decision step 78 leads back to the step 44. The coding line 13 is accumulated once again and the C1 register is loaded with the value of 16. The difference is recalculated once again and the DF register is loaded with the value of $+1$. Thus the coding process enters the branch beginning with the step 49. Since the next color change element in the reference line 12 is located after the current color change element in the coding line 13, the coding proceeds to the decision step 55. Since the D1 register value is equal to $(1-3=)-2$, (step 51), the step 60 generates the output signal "VR(1)." The coding steps of FIG. 2 yield exactly the same coding signals as generated before under CCITT coding procedure.

The example in FIG. 1C is illustrative of some subtleties in the coding process. The initial reference line accumulation step 43 and coding line accumulation step 44 loads the value of 2 into the register R1 and the value of 1 into the register C1. Since the register DF is $-1$ after step 45, the step 79 branch is entered. The D1 register is equal to $(1-0=)1$. The D2 register is equal to $(1-3=)-2$. Therefore an output signal corresponding to "VL(1)" is generated by the step 82.

Since D1 is not less than 0, the step 42 is returned to. The R2 register is loaded with a value of 2 from the accumulation of the reference line 14 and the R1 register is loaded with the value of 6. Similarly, the coding line 15 is accumulated and C1 register is updated to 3. The register DF is therefore $-3$ and the branch beginning with step 79 is entered again. The D1 register is equal to $(3-2=)+1$ and the D2 value is equal to $(3-3=)0$. Since the D2 register value is equal to 0, the decision step 81 leads to the generation of the output signal "VL(3)." Subsequently the coding process returns to step 42 since the D1 value is equal to $+1$. The R2 register is updated to the value of 6 and the R1 register to the value of 8 for the new change picture element at the ninth position. The C1 register is changed to 6 at the step 44 (the coding line 15 is accumulated) and the current difference is calculated, $-2$, and stored in the DF register.

Thus the coding process enters the step 79 branch once again. The D1 register is changed to 0 and the D2 register to $-1$. Since the D2 value is less than 0 by the decision step 81, the output signal "VL(2)" is generated. The change picture element at the seventh position in the coding line 15 has been coded with respect to the change picture element in the ninth position in the coding line 14.

Since the D1 register is equal to $(6-6=)0$, the process returns to step 42. The R2 register is changed to 8 and the R1 register to 10 to reflect the run length accumulation of the reference line change picture element in the eleventh position. The coding line 15 is also accumulated and the C1 register is set to 7. Again the process enters the branch beginning with a step 79. The D1 register is set to $-1$ and the D2 register equal to 0. Therefore the step 82 is performed and the output signals for "VL(3)" is performed once again.

However, in this case the D1 register value is less than 0 in the step 83. Therefore the process continues to the coding line accumulation step 84. The C1 register is updated to 9 for the next change picture element at the tenth position in the coding line 15. The difference in values in the C1 and R2 registers is recalculated for a value of $+1$, indicating that the previous change picture element in the reference line 14 is behind the current change picture element in the coding line 15. Therefore, the decision steps 86 and 87 pass the coding process back to the step 51. Note, however, that if the difference had been negative, indicating that the previous change picture element in the reference line 14 was to be ahead of the current change picture element of the coding line 15, then the subbranch beginning with the step 89 is entered. Depending upon the magnitude of the difference in the register DF value the change picture element at the tenth position of the coding line 15 may be coded in the horizontal mode or in the vertical mode (step 91).

In the present case the coding procedure returns to step 51 where the D1 register is determined to be +2 and the D2 register is loaded with the value of +1. Since the current change picture element in the reference line is at the eleventh position in the reference line 14, a calculation of C1−R1 yields a value of −1 for the DF register. The decision steps 54 and 55 lead to the generation of an output signal "VR(1)" by the step 60. The coding process returns to the step 44 since the DF register is equal to −1.

The coding line 15 is accumulated again for a value of 10 in the C1 register.

Because the current change picture element in the reference line 14 is directly above the new coding line change picture element steps 45, 46 and 48 yield an output signal of "V(0)."

Similarly the short loop of steps 42–48 determine the coding of the two remaining change picture elements in the coding line 15 in FIG. 1C.

THE CODING DEVICE OF THE PRESENT INVENTION

Figure 3:
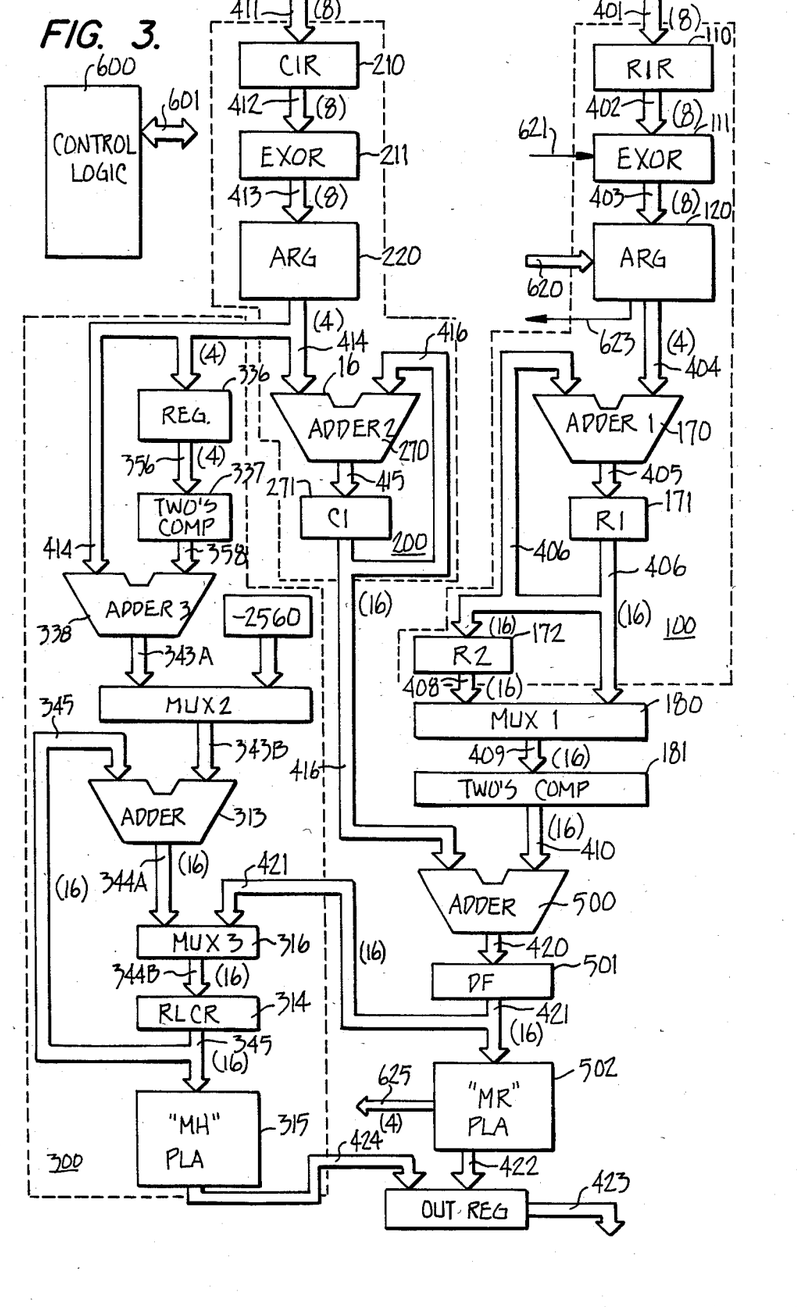
FIG. 3 is a view of the overall architecture of the exemplary device used in carrying out the two-dimensional coding method.

The device shown in FIG. 3 is particularly adapted to perform the coding procedure described above.

The device has major units in the reference line accumulating run length generating unit 100, the coding line accumulated run length generation unit 200 and the one-dimensional processing unit 300. All three units 100, 200, 300 are delineated by dashed lines.

These units, together with the rest of the device, are controlled by the control logic unit 600, which directs the operation of the device in accordance with the novel coding procedure explained previously. The operation depends upon the status of the registers, such as R1 and C1, for the election of coding branches. The particular logic circuits used to indicate the status of registers to the control logic 600 are not shown since it is well known how to design and connect such circuits between registers and a control logic unit.

The unit 600 communicates with the rest of the devices through control lines symbolized in FIG. 3 by a bidirectional arrow 601. Where a particular element of the device is discussed in detail below, the individual control lines for that element are also explained. However, one skilled in the art may also deduce the nature and operation of the control lines not shown from the explanation below.

For convenient notation, in the drawings there are many data paths near which there are numbers enclosed by parentheses. These enclosed numbers indicate the width of a data path, or the number of signals which can be transferred in parallel on the data path.

The reference line accumulated run length generating 100 unit has an input register 110 which receives from a line memory (not shown) the scanned and digitized picture information of the reference line. All such line information including that of the coding line, is created by the line by line scanning of the original document by some electro-optical device. The scanned image is digitized into binary signals and stored on the line memory for coding and transmission. The reference input register 110 receives the picture data 8 bits, or one data block, in parallel at a time. At the next loading, which may be the next clock cycle if the data block is of one color, the following 8 bits on the reference line are loaded into the register 110 and the process is repeated until the entire reference line has been transferred into the input register 110 and processed. At the end of the reference line the operation is repeated for the next reference line which may be the coding line which had been just processed with the preceding reference line.

The picture data in the input register 110 is transferred in 8-bit units to an EXCLUSIVE OR gate block 111 and an accumulated run length generator block 120. The EXCLUSIVE OR block 111 receives the picture data from the input register 110 in parallel by a data path 402 to either pass the data unchanged or to invert them before passing them to the accumulated run length generator block 120. To control the pass and inversion function, the EXCLUSIVE OR block 111 receives an alternating signal on a control flag line 621 from the control logic 600.

With the operation of the EXCLUSIVE OR block 111 the accumulated run length generator block 120 sequentially generates accumulated run length each color unit in the received data block in the register 110. The generator 120 generates each accumulated run length per clock cycle.

The run length of each color unit in the data block is received by an adder 170, which in conjunction with the R1 register 171, accumulates the run lengths of color units in the reference line independent of the data blocks. For example, assume a reference line with a color unit having a run length of 12 picture elements. Further assume that the first picture element of the color unit is loaded into the input register 110 as the last part of a data block. Then the following eight picture elements of the color unit are loaded as a complete data block and finally three picture elements of the color unit are loaded as part of a third data block. The generator block 120 generates the accumulated run length of each color unit in each data block. First it will generate the number 8 in binary for the last color unit in the first data block, then the number 8 in binary once more for the next data block and the number 3 in binary as the accumulated run length of the first color unit in the third data block.

The control logic 600 recognizes these run lengths as belonging to color units all having the same color and are consecutive. Therefore the first number 8 is added to the sum of run lengths of previous color units in the coding stored in the R1 register 171. When the next number 8 appears at one input terminal of the adder 170, the previous accumulated sum is transferred to the other input terminal of the adder 170 and the two numbers are added and stored once more in the R1 register 171. When 3 appears from the generator block 120, the cycle is repeated so that the final value of 12 is accumulated in the R1 register 171 for the accumulated run length of the subject color unit.

These accumulated run lengths for the color units in the reference line are the values used in the two-dimensional coding process above. Each instruction to accumulate the reference line is an instruction to the reference line run length accumulating unit 100 to operate until the accumulated run length of the next color unit has been stored in the R1 register 171. If the next color unit is located entirely in one data block in the input register 110, then one clock cycle will suffice. If, on the other hand, it stretches across two data blocks, then two clock cycles will be required and so forth.

The R2 register 172 is also connected to the R1 register 171 by a 16-bit wide path 407 so that the accumulated run lengths of color units in the reference line may be stored as required by the above coding method.

The values stored in the R1 and R2 registers 171, 172 are selectively passed to an adder 500 by the operation of a multiplexer 180. Since these values are sometimes used in subtraction operations, the values are changed by the operation of a TWOS COMPLEMENT block 181, which lies between the multiplexer 180 and the adder 500.

In a similar fashion the picture data in the coding line is processed by the coding line accumulated run length generating unit 200 which has corresponding elements to the elements in the reference line accumulated run length generating unit 100 so that the previously identified C1 register 271 sequentially stores the accumulated run length of each color unit in the coding line.

The difference in the values of the C1 register 271 and the R1 register 171, or sometimes the R2 register 172, are generated by the adder 502 and the result stored in the DF register 501.

Depending upon control signals, the value in the DF register 501 is received by an MR PLA 502 which performs the vertical, or two-dimensional, coding. The PLA (Programmed Logic Array) 502 contains the coded signals for the "VR(DF)," "V(0)," and "VL(DF)." The PLA 502 also contains the registers D1 and D2. These registers may also be located outside the PLA 502 but in this embodiment they are formed as part of the PLA 502. The PLA 502 sends its coded output signals to an output register 503 which releases its contents for transmission by a facsimile transmitter. The PLA 502 also sends control signals back to the control logic along control lines 625, which indicate the status conditions within the PLA 502, such as the state of the registers D1 and D2.

Besides the PLA 502, the PLA 315 for run length, or one-dimensional coding, may be embodied in a ROM (Read Only Memory). The control logic unit 600 may also be a PLA or ROM. This observation and the setting of these units are well known on the art.

The circuitry and operation of the one-dimensional or run length processing unit 300 together with the coding line input register 210, the EXCLUSIVE OR gate block 211 and accumulated run length generator block 220, is fully explained in the applicants' previously mentioned co-pending patent application, entitled A Facsimile Device For Run Length Coding.

The result is that the previously mentioned run length coding register (RLCR) 314 receives and stores the run length of each color unit of the coding line while the accumulated run length of that color unit is generated and stored in the C1 register 271. The RLCR register 34 receives its contents normally through the data path to which the adders 338 and 313 belong. However, in the pass mode, sometimes the run length between the change picture elements in the coding and reference lines is required ($a_1-b_1$ in the international standard language). This difference is calculated in the DF register 501 and stored in the RLCR register 314 through a multiplexer 316 (see step 57 in FIG. 2). This RLCR value is coded if, in the coding process, the horizontal mode is required. The values in the RLCR register 314 are received by an MH PLA 315, which is programmed for horizontal, or run length coding. These values are also sent to the output register 503 for transmission.

The operation and design of registers, EXCLUSIVE OR and TWOS COMPLEMENT logic blocks, adders and multiplexers used in the present device are well known art. The operation and details of the remaining accumulated run length generator block 120 (and likewise 220) in FIG. 3 are illustrated in FIG. 4A and following drawings.

Figure 4A:
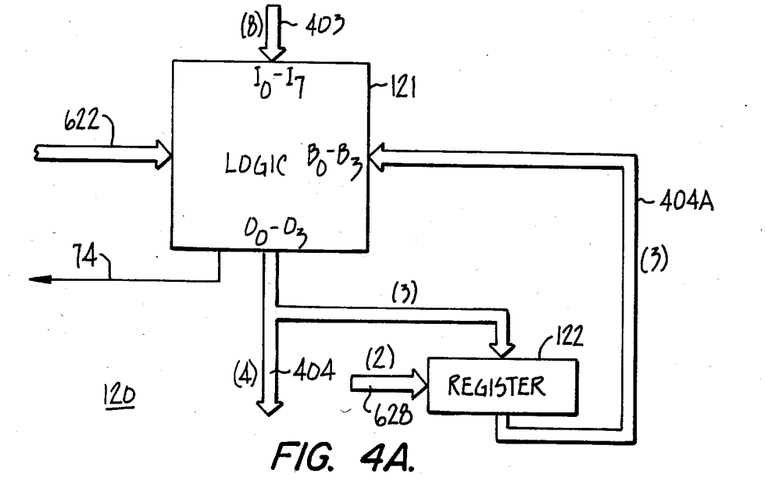
FIG. 4A is a detailed view of the accumulated run length generating block in FIG. 3.

In FIG. 4A the accumulated run length generator block 120 is shown divided into a logic circuit 121 and a register 122., The logic circuit 121 receives in parallel the signals $I_0-I_7$ from the EXCLUSIVE OR gate 111. On each clock cycle the logic circuit 121 generates the accumulated run length in binary of the color units in the data block represented by the $I_0-I_7$ signals. This is shown by an example in FIG. 4B. These output signals are carried by the $O_0-O_3$ output lines,, three of which also go to the input terminals of the register 122. The $O_0-O_2$ signals are by the register 122 and fed back into the logic circuit 121.

A control line 623 simply connected to the $O_3$ output line carries a signal to inform the control logic unit 600 when the last color unit in a data block is being processed. The control lines 622 control the timing and operation of the logic circuit 121. Similarly, the load and clear functions of the register 122 are controlled by signals of the double control lines 628.

Figure 4B:
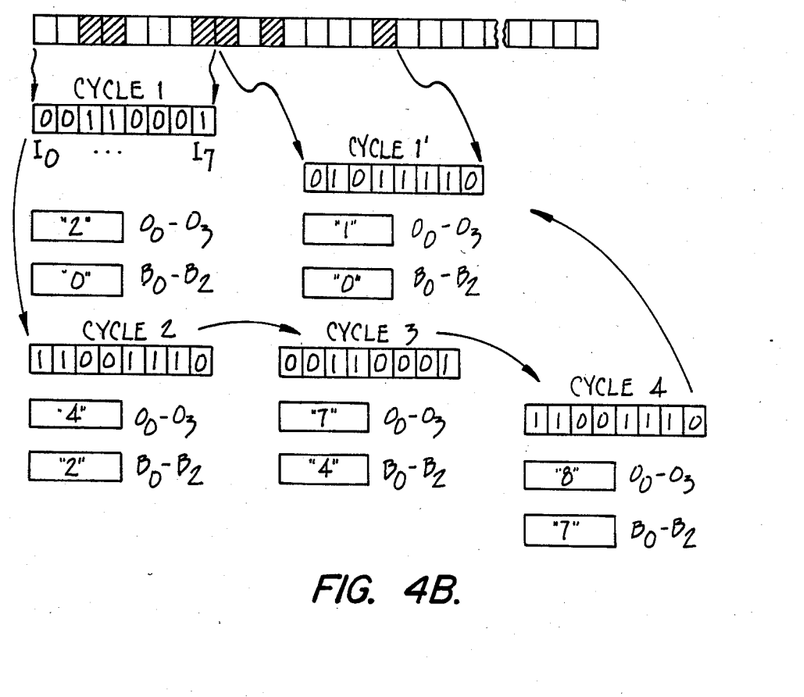
FIG. 4B is an example of the operation of the block.

When the control logic unit 600 receives a signal on the line 623, the color flag signal on the line 621 is not inverted. Rather, the next data block is loaded into the register 110 and the results from the accumulated run length generator block 120 are combined by the adder 170 with the accumulated run length stored in the R1 register 171 by the feedback path 406. If the first color unit in the present data block has a different color from that of the last color unit in the previous data block, the R1 value remains unchanged. A zero is added to the R1 value. On the other hand, if the two colors are the same, then the R1 value increases by the number of picture elements in the first color circuit of the present data block. Cycles 4 and 1 in FIG. 4B illustrate the operation of the accumulated run length generator block 120 at the transition point between two data blocks.

Figure 5:
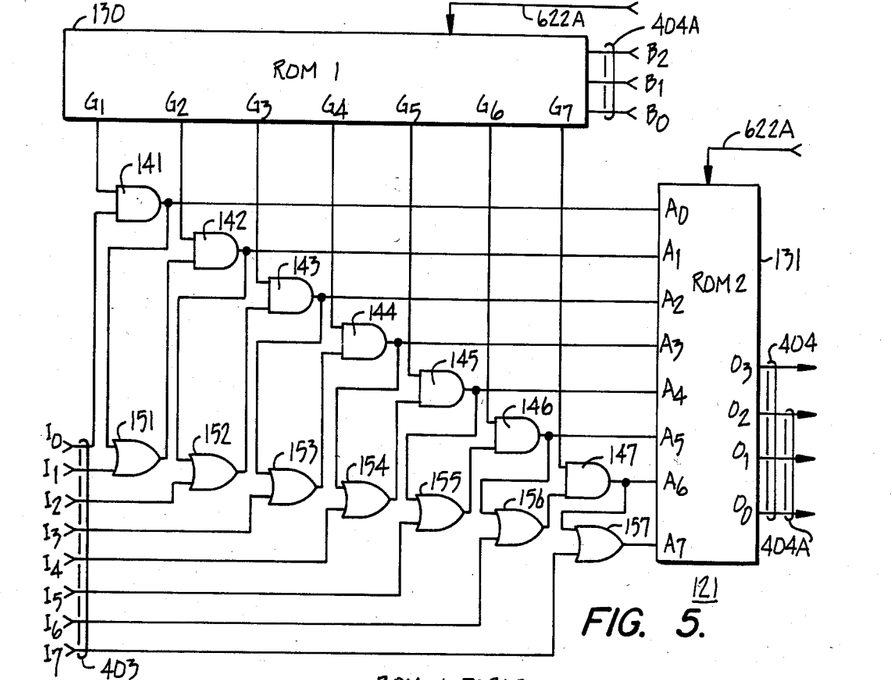
FIG. 5 is the detailed circuit for part of the block shown in FIG. 4A.

Details of the circuit 122 are shown in FIG. 5. This circuit 122 has two ROMS 130, 131 which are interconnected by OR gates 151-157 and AND gates 141-147. The ROMs 130, 131 are enabled by a signal on the control line 22A.

Figure 6:
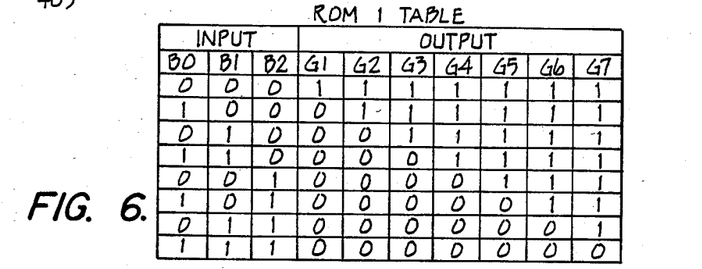
FIG. 6 and FIG. 7 show the input/output tables for the two ROMs in FIG. 5.

The ROM 130 receives as input signals the $B_0-B_2$ signals on the feedback path 404A shown in FIG. 4A. The signals correspond to the accumulated run length of the previous color unit, which is stored in the register 122. The ROM 130, set in accordance with the input-output table in FIG. 6 and responsive to these input signals $B_0-B_2$, generates signals which form a mask for the input signals $I_0-I_7$.

When the register 122 is empty, i.e., "0", the output signals $G_1-G_7$ of the ROM 130 enables all of the AND gates 141-147 to be able to generate a "1" output signal. A ONE input signal on an input terminal will generate a ONE output signal on that order output terminal and higher. For example, if $I_3$ is "1," then $A_3-A_7$ are "1." When the register 122 contains a number, say, 3, the output signals that $A_0-A_2$ signals are ZERO. The lowest order appearing ONE from the ROM 130 ensures that remaining output signals $I_3-I_7$ will cause a "1" signal on that order output and higher.

For cycle 1 of the example in FIG. 4B, each of the AND gates 141-147 has at least one input terminal with a "1" signal from the ROM 130. The input signals $I_0$–$I_7$, "00110001," cause the output signals of the OR gates 151-157 and the AND gates 141-147 to be "0011111". The output signals $A_0$–$A_7$ are thus "00111111" and "0011111" respectively.

Figure 7:
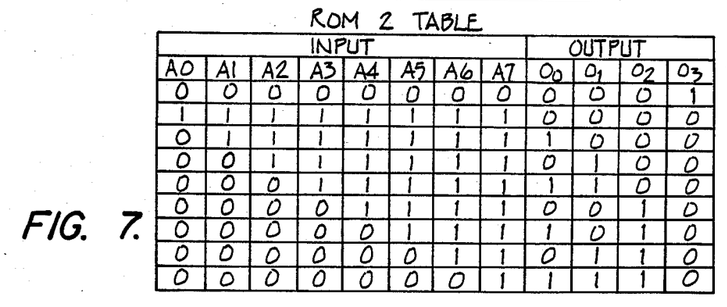

The signals $A_0$–$A_7$ are received by the ROM 131. As illustrated by the input-output table in FIG. 7, the ROM 131 is set so that the number of ZEROs in the input signals $A_0$–$A_7$ appear in binary on the output signals $O_0$–$O_3$. In the present example, $O_0$–$O_3$ equal "0010." $O_0$ is "0", O is "1", $O_2$ is "0" and $O_3$ is "0" in the reverse-ordered binary output table in FIG. 8.

In FIG. 4B, cycle 2, the register 122 now contains the value of "2" or "0010" in binary. Since the path 404A carries the three lower order bits back to the circuit 121, the ROM 130 receives "010⇌ as input signals $B_0$–$B_2$. This combination of input signals, by reference to the FIG. 5 table, indicates that the first two output signals $G_1$, $G_2$ are "0," while the remaining output signals $G_3$–$G_7$ are "1." At the same time the EXCLUSIVE OR block 111 inverts all of the signals in the input register 110 so that the second color unit, originally black, appears as white or "0" signals on $I_2$ and $I_3$. Since input signal $I_4$ is a "1," all of the output signals for OR gates 154-157 are "1," while the output signals for OR gates 151-153 are "1." Therefore the output signals for the AND gates 141-144 are "0" and the remaining AND gates 145-147 are "1." The output signals $A_0$–$A_3$ are "0" and the signals $A_4$–$A_7$ are "1." FIG. 7 implies that the output signals $O_0$–$O_3$ are "0100", i.e., there are four zeros as inputs to the ROM 131. In this manner the circuit shown in FIG. 6 generates the accumulated run lengths of color units within a data block.

Figure 8:
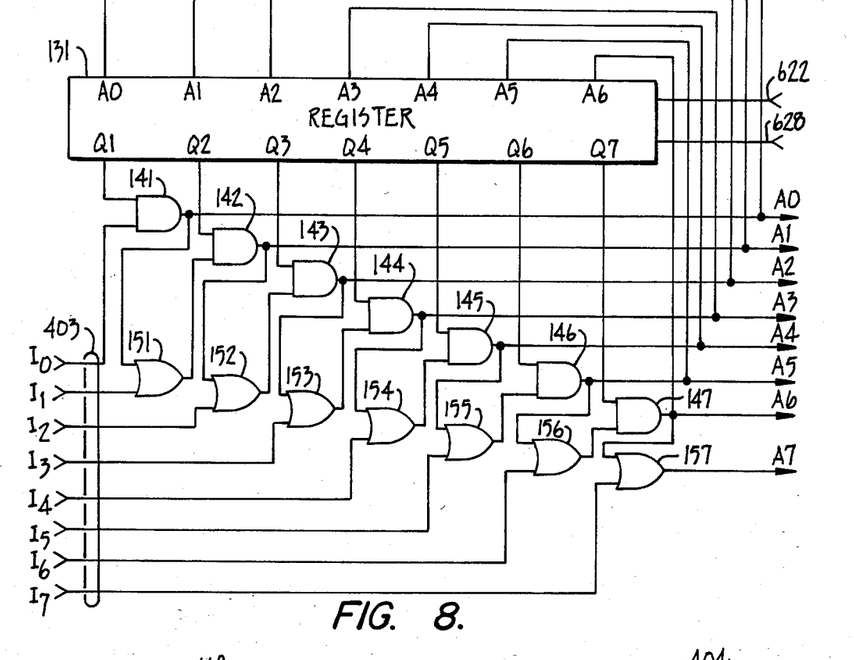
FIG. 8 shows an alternative circuit which may be used in the circuit shown in FIG. 5.

An alternative to some of the circuitry shown in FIG. 5 is illustrated in FIG. 8 in which the ROM 130 has been replaced by a register 132. The register 132 does not require feedback signals from the register 122. Instead, the register 132 takes its input signals directly from the AND gates 141-147. The input signals $A_0$–$A_6$ in one cycle into the register 132 appear as respective register 132 output signals $Q_1$–$Q_7$ in the next cycle. A signal on the control line 22A, enables the leading of the $A_0$–$A_7$ signals into the register 52 and the appearance as $Q_1$–$Q_7$ output signals of the previous $A_0$–$A_7$ signals. A signal on the line 622B clears the register 132.

Figure 9:
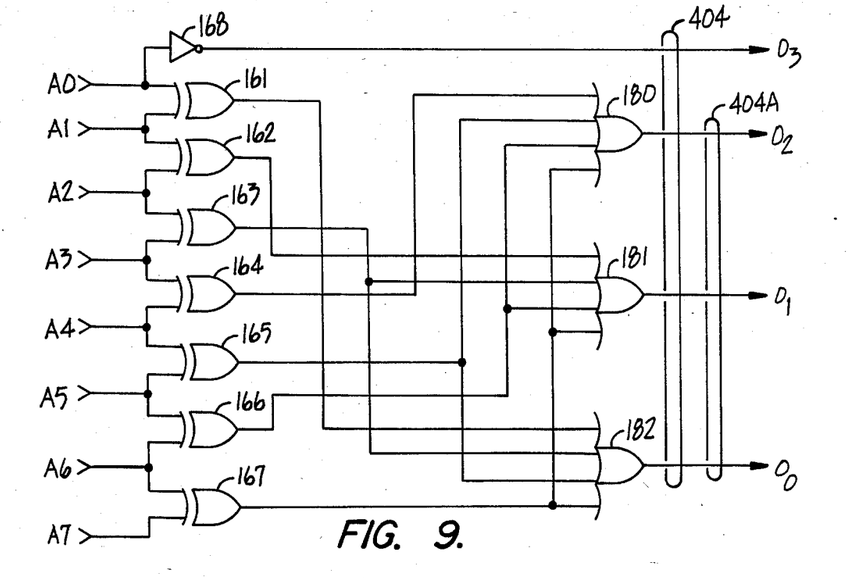
FIG. 9 is another alternative circuit which may be used in place of the second ROM shown in FIG. 5.

FIG. 9 shows a replacement for the ROM 131 in FIG. 5. The circuit in FIG. 9 uses combinatorial logic by the use of the EXCLUSIVE OR gates 161-167 and an inverter 168. The output terminals of the EXCLUSIVE OR gates 161-167 form the input terminals of the OR gates 180-185 which generate the output signals $O_0$–$O_3$. The $O_3$ output signal is generated by the inverter 168.

We claim:

1. A facsimile device for encoding the positions of change picture elements in a coding line of digitized picture data, with respect to the positions of change picture elements in a reference line of digitized picture data, said device comprising a control logic for controlling the operations of said device;

means, coupled to said control logic and responsive to said coding line and reference line picture data for sequentially generating in parallel the accumulated run lengths of each change picture element in said coding line and reference line;

means responsive to said sequential generating means for determining the difference in accumulated run lengths of a coding line picture element and a reference line change picture element;

means coupled to said control logic and responsive to said determining means for encoding said difference in accordance with a predetermined code; and whereby said control logic, responsive to said difference, selectively advances said generating means for the accumulated run length of the next coding line change picture element and the next reference line change picture element and enables said encoding means in accordance with predetermined conditions upon said difference.

2. A facsimile device as in claim 1 wherein said generating means receives said digitized picture data in data blocks generates in a single clock cycle the accumulated run length of a change picture element in a picture data block provided the previous change picture element is also in said picture data block.

3. A facsimile device as in claim 2 wherein said generating means comprises a first generator for sequentially generating the accumulated run lengths of change picture elements in said coding line and a second generator for sequentially generating the accumulated run lengths of change picture elements in said reference line, each generator comprising means responsive to said digitized picture data in said data blocks for generating the run length of each color unit in a data block;

means responsive to said color unit run length generating means for combining the run length of a color unit with the run lengths of previous color units;

whereby the accumulated run length of the change picture element beginning the next color unit is generated.

4. A facsimile device as in claim 3 wherein said combining means comprises an adder having a first input terminal coupled to said generating means;

a register having an input terminal and an output terminal, said input terminal coupled to an output terminal of said adder and said output terminal coupled to a second input terminal of said adder;

whereby said register sequentially holds the accumulated run lengths of said change picture elements.

5. A facsimile device as in claim 4 wherein for a color unit in a plurality of blocks of picture data, said color unit run length generating means sequentially generates the partial run lengths of said color unit located in each picture data of said plurality and said combining means combines said partial run lengths with the change picture element beginning the next color unit.

6. A facsimile device as claim 5 wherein said color unit run length generating means comprises an input register for sequentially holding a block of register data; and a logic block coupled to said input register for EXCLUSIVE ORing each signal of said data block in parallel.

7. A facsimile device as in claim 6 wherein said color unit run length generating means further comprises a generator block coupled to said logic block for sequentially generating the accumulated run length of each color unit in said picture data block at each operation of said logic block.

8. A facsimile device as in claim 7 wherein said generator block comprises first logic means coupled to said passing and inverting means for generating an output string of ONEs and ZEROs whose ratio is indicative of the accumulated run length of a color unit in said data block;
a register coupled to said first logic means for holding an output string indicative of the accumulated run length of a previous color unit in said block; and
second logic means coupled to said first logic means for generating signals indicative of said accumulated run length in binary.

9. A facsimile device as in claim 1 further comprising a means coupled to said control logic and responsive to said coding line data blocks for generating coded run lengths of color units in said coding line whereby said control logic selects said coded run lengths for encoding positions of change picture elements in said coding line without reference to said reference line under predetermined conditions.

10. In a facsimile system for digitized picture elements of units of alternating color, a method for coding a line of said digitized picture elements with respect to a reference line of said digitized picture elements, said method comprising
   (a) accumulating the run lengths of color units previous to a color change element in said coding line;
   (b) accumulating the run length of a color change element in said reference line from the run length of color unit previous to said color change element;
   (c) determining the position of a color change element in said coding line with respect to the position of a color change element in said reference line by the difference between the accumulated run lengths of said coding line color change element and said reference line color change element; and
   (d) generating a coded signal indicative of said difference, wherein the steps (a), (b), (c) and (d) are selectively repeated in predetermined sequences responsive to a prior determination of said accumulated run length differences, each repetition of steps applying to successive color change elements in said coding and reference lines.

11. In a facsimile system for digitized picture elements of units of alternating color, a method for coding a line of said digitized picture elements with respect to a reference line of said digitized picture elements, said method comprising
   (a) accumulating the run lengths of color units previous to a color change element in said coding line;
   (b) accumulating the run length of a color change element in said reference line from the run length of color unit previous to said color change element;
   (c) determining the position of a color change element in said coding line with respect to the position of a color change element in said reference line by the difference between the accumulated run lengths of said coding line color change element and said reference line color change element; and
   (d) generating a coded signal indicative of said difference.

12. The method as in claim 11 further comprising
   (e) holding the run length of a color unit immediately previous to a coding line color change element having its run length accumulated;
   (f) generating a coded signal indicative of said run length responsive to a determination of said accumulated run length differences, and
   whereby said coding line is run length coded.

13. In a facsimile system for digitized picture element signals of units of alternating color, the first picture element of each color unit being a color change picture element, a method for coding a line of digitized picture data with respect to a reference line of digitized picture data, said methods comprising
   (a) accumulating the run length of the first color change picture element not yet having its run length accumulated in said reference line;
   (b) accumulating the run length of the first color change picture element not yet having its run length accumulated in said coding line;
   (c) determining the position of the last accumulated color change picture element in said coding line with respect to the position of the last accumulated color change picture element in said reference line by the difference in said accumulated run lengths of said color change picture elements in said coding line and said reference lines; and
   (d) generating an output signal, if said difference in step (c) is zero, indicating said zero difference, and returning to step (a).

14. The method as in claim 13 further comprising
   (e) accumulating the run length of the next color change picture element in said reference line if the difference in step (c) indicates that said last accumulated coding line color change picture element is ahead of said last accumulated reference line color change picture by less than a predetermined amount;
   (f) determining the position of the last accumulated color change picture element in said coding line with respect to the position of the last accumulated color change picture element in said reference line by the difference in said accumulated run lengths;
   (g) generating a pass output signal if the difference in step (f) indicates that the last accumulated color change picture element in said coding line is ahead of the last accumulated color change picture element in said reference line; and
   (h) accumulating the run length of the next color change picture element in said reference line and returning to step (c).

15. The method as in claim 14 further comprising
   (i) generating an output signal indicative of the run length of the color unit immediately preceding said last accumulated coding line color change element if the difference in step (g) indicates that said last accumulated coding line color change picture element is behind color change picture element previous to said last accumulated reference line color change picture element and if the difference in step (c) indicates that said coding line color change picture element is behind said reference line first color change picture element by at least said first predetermined amount.

16. The mehtod as in claim 15 wherein said first predetermined amount is four picture elements.

17. The method as in claim 15 wherein step (i) further includes accumulating the run length of the color change picture element not yet having its run length accumulated in said coding line and generating a second output signal indicative of the run length of the color unit immediately preceding said color change picture element in said coding line.

18. The method in claim 15 further comprising
   (j) generating an output signal, if the difference in step (f) indicates that said last accumulated coding line color change picture element is behind said last accumulated reference line color change picture element and if the difference in step (c) indicates that said last accumulated coding line color change picture element is behind the color change picture element previous to said last accumulated reference line color change picture element by less than said first determined amount, said output signal indicating said difference in step (c).

19. The method as in claim 13 further comprising
(k) generating an output signal, if the difference in step (c) indicates that said last accumulated coding line color change picture element is behind said last accumulated reference line color change picture element by less than a second predetermined amount, said output signal indicating said difference in step (c).

20. The method as in claim 19 wherein said second predetermined amount is four picture elements.

21. The method as in claim 9 further comprising
(l) returning to step (i) if the difference in step (c) indicates that said last accumulated coding line color change picture element is behind said last accumulated reference line color change picture element by at least said second predetermined amount.

22. The method as in claim 21 further comprising
(m) determining the position of the last accumulated color change picture element in said coding line with respect to the position of the color change picture element previous to said last accumulated color change picture element in said reference line by the difference between the accumulated run lengths of said color change picture elements; and
(n) returning to step (a) if the difference in step (m) indicates that said last accumulated color change picture element in said coding line is not behind said color change picture element previous to said last accumulated color change picture element in said reference line.

23. The method as in claim 22 further comprising
(o) accumulating the run length of the next color change picture element in said coding line if the difference in step (m) indicates that said last accumulated color change picture element in said coding line is behind said color change picture element previous to said last accumulated color change picture element in said reference line; then
(p) determining the position of the last accumulated color change picture element in said coding line with respect to said color change picture element previous to said last accumulated color change picture element in said reference line by the difference in accumulated run lengths of said color change picture elements; and
(q) returning to step (i) if the difference in step (p) indicates that said last accumulated coding line color change picture element is behind said color change picture element previous to said last accumulated reference line color change picture element by at least said predetermined amount.

24. The method as in claim 23 further comprising
(r) generating an output signal, if the difference in step (p) indicates that said last accumulated coding line color change picture element is behind said color change picture element previous to said last accumulated reference line color change picture element by less than said predetermined amount, said output signal indicating said difference in step (p).

* * * * *